United States Patent [19]

Rebeyrolle et al.

[11] Patent Number: 5,183,188
[45] Date of Patent: Feb. 2, 1993

[54] METHOD OF MAKING A DISPENSING HEAD, AND THE CORRESPONDING HEAD AND DISPENSER

[75] Inventors: Michel Rebeyrolle; Bernard Schneider, both of St. Menehould, France

[73] Assignee: Cebal, Clichy, France

[21] Appl. No.: 606,903

[22] Filed: Oct. 31, 1990

[30] Foreign Application Priority Data

Nov. 2, 1989 [FR] France ............................. 89 14731

[51] Int. Cl.⁵ ............................................. B67D 5/40
[52] U.S. Cl. ................................ 222/383; 222/402.1
[58] Field of Search ............ 222/321, 383, 394, 402.1, 222/402.12, 542; 264/262, 275

[56] References Cited

U.S. PATENT DOCUMENTS

| | | | |
|---|---|---|---|
| 2,773,722 | 12/1956 | Abplanalp | 222/394 |
| 2,937,409 | 5/1960 | Cole | 264/275 X |
| 3,064,310 | 11/1962 | Cooprider | 222/321 |
| 3,120,907 | 2/1964 | Harnage | 222/321 |
| 3,361,078 | 1/1968 | Cooprider | 222/383 X |
| 3,680,187 | 8/1972 | Murray | 264/275 X |
| 4,010,052 | 9/1974 | Edwards | 264/275 X |
| 4,071,279 | 1/1978 | Chung | 264/275 X |
| 4,297,313 | 10/1981 | Duckstein | 264/275 X |
| 4,434,915 | 3/1984 | Kirk, Jr. | 222/383 X |
| 5,031,384 | 7/1991 | Rebeyrolle et al. | 222/95 X |

FOREIGN PATENT DOCUMENTS

| | | | |
|---|---|---|---|
| 0385896 | 9/1990 | European Pat. Off. | 222/402.1 |
| 2314771 | 1/1977 | France | 222/394 |
| 1179892 | 2/1970 | United Kingdom | 222/402 |

Primary Examiner—Andres Kashnikow
Assistant Examiner—Kenneth Bomberg
Attorney, Agent, or Firm—Dennison, Meserole, Pollack & Scheiner

[57] ABSTRACT

The invention relates to a method of making a dispensing head comprising a rigid annular dome made of plastics and, above the dome, a dispensing valve or a pump, the valve or pump having an annular fixing shoulder, the circumference of which is made at least externally of plastics, the lower end of the dome carrying an annular flange for fixing over a can body. In the method disclosed the valve or pump is disposed between tools which tightly grip the fixing shoulder and provide play which limits its heating during a molding operation. Annular tools are provided, forming a circular gap with the tools that grip the fixing shoulder, the gap closing over the shoulder and forming the geometry of the dome and its annular fixing flange. Molten plastics are injected into the annular gap through one or more injection orifices, the molded dispensing head cooled and demolded. The invention also relates to the corresponding preassembled heads and dispensers using them. The invention can be utilized in packaging of liquid or cream products in aerosol or pump type dispensers.

12 Claims, 7 Drawing Sheets

METHOD OF MAKING A DISPENSING HEAD, AND THE CORRESPONDING HEAD AND DISPENSER

BACKGROUND OF THE INVENTION

The invention concerns a method of making a head to be fixed on the upper end of the rigid body of a can, to form a dispenser of the aerosol type or a dispenser with a pump, the internal volume of the dispenser not being partitioned. The invention also concerns the head obtained and a dispenser comprising that head.

As indicated in document FRA 2606686, a metal can body forming part of a dispenser with a means of propulsion of the aerosol type is already known; the body is made in one piece by impact extrusion from a slug of aluminium or alloy, then by forming the open upper end of its cylindrical body into a necked part or dome, which usually has a rolled edge above it. The can body will then be filled with liquid or cream product, and the dispensing valve will be fixed to the top by crimping the cup-like valve fixing member around the preceding rolled edge. In this version the neck of said upper end is complex and involves several passages through the machine.

There are also cans where the body made of tinplate is cylindrical with a crimped bottom, and where the cup-shaped member for fixing the valve is itself crimped to the upper end of the body when it has been filled with the product. This metal/metal crimping brings risks of corrosion despite the coating.

Applicants have attempted to perfect a dispenser comprising a can body which is easy to produce and which does not involve such risks of corrosion for the assembled dispenser.

SUMMARY OF THE INVENTION

The subject of the invention is, firstly, a method of making a dispensing head comprising a rigid annular dome made of plastics and, above the dome, a valve for an aerosol or a pump for dispensing a liquid or cream product, the valve or pump being fitted with an annular fixing shoulder, the circumference of which is made at least externally of plastics, the lower end of the dome carrying an annular means for fixing over the end of a rigid can body, wherein:

a) the valve or pump is disposed between tools which tightly grip the annular shoulder and which contain the valve or pump with play which limits their heating during the moulding operation;

b) annular tools are arranged around the preceding tools, the annular and preceding tools together defining an annular gap, which in a downward direction at least comprises an inwardly widened portion which closes tightly onto the annular shoulder for fixing the valve or pump, then a portion of increasing diameter, followed by at least one annular gap, typically vertical or at least descending, at the lower end, filled by a bottom annular tool, the annular gap having at least one orifice for injecting plastics material;

c) the molten plastics material is injected into the annular gap through the injection orifice or orifices and cooled, and the dispensing head obtained is demoulded.

The preassembled head obtained avoids any risk of corrosion in connection with its assembly with a metallic, metalloplastic or plastics can body. It enables the body to be filled with product, normally in liquid or cream form; this is a great advantage, since the filling process can be shortened particularly by using a plurality of simultaneous flows. As will be seen from the few examples, the tight assembly of the head with the upper end of the can body is effected by adhesion, welding or plastic locking, all reliable methods which do not involve any risk of corrosion such as those involved in metal/metal assemblies.

The upper tools cover the top of the annular gap, except for one or more injection points. Each injection point of small diameter, typically 0.5 to 1 mm, is at the bottom of a well or cavity in which a hot runner system is inserted for moulding by injecting plastics into the annular gap.

According to the geometry of the moulded linkage to be formed, there may be either one injection orifice or more, and typically 2 to 5 orifices for simultaneous injection of the plastics. The injection conditions are chosen so that the moulded linkage is formed in 0.6 to 3 seconds of injection; the cooling time before the tools are displaced for demoulding is preferably at least 3 times the injection period.

It has been found important to provide well positioned play around the valve or pump during the moulding operation, in order to maintain the quality of the valve or pump during moulding. It is the valve or pump portion that suffers most from heating, and the annular shoulder of the valve or pump also has to be arranged accurately. The following arrangement has been perfected: The tools containing the valve or pump include a bottom tool with an upper peripheral edge at the top of it, the annular shoulder of the valve or pump bearing on the edge when the valve or pump is in the cavity; the annular shoulder then extending at least 0.8 mm beyond the upper peripheral edge, and the cavity having diametric play of at least 0.2 mm relative to the valve or pump, in its upper portion and over a height of at least 5 mm and, preferably below, a centering portion at least 3 mm high and with maximum diametric play of 0.2 mm relative to the valve or pump.

As a further means of minimising the internal heating of the pump, it is desirable for the top central tool to cover the upper part of the valve or pump, with lateral play of at least 0.3 mm in diameter.

The dimensions of the various tools are generally adjusted so that their gripping prior to injection of the plastics results in tight gripping of the annular shoulder of the valve or pump between the peripheral surface and edge for supporting the top central tool and the bottom tool. The annular shoulder of the valve or pump must preferably extend 1 to 3 mm beyond the upper peripheral edge of the bottom tool.

As far as the quality of the linkage between the dome and the annular shoulder of the valve or pump resulting from injection moulding is concerned, it has been found that, when the plastics materials of the dome and annular shoulder are of the same type, that linkage is a weld. The width of the annular shoulder taken up in the weld can only be determined if the type of pump used is known. When the plastics material of the dome and shoulder are different, the linkage obtained looks like glueing with intimate adhesion, without remelting, and it has been confirmed that the linkage nevertheless gives a good seal. To improve the mechanical strength and reliability of that end, it is then advisable to equip the part of the annular shoulder contained in the molding with a small annular rib, e.g., of 0.4 by 0.4 mm, located e.g. at its end edge or on a surface of the shoulder near that end. From the point of view of the strength of the linkage obtained, it is preferable for the internal enlarged portion of the dome to grip the annular shoulder over a width of 1 to 3 mm.

The invention also relates to a dispensing head to be fixed on the rigid tubular body of a can, obtainable by the method just described. The head comprises an annular dome made of plastics and moulded around the annular shoulder for tightly fixing a valve or pump, the dome being made of one piece and comprising only the following portions in a downward direction:

an upper annular portion comprising an inner enlarged portion which grips the annular shoulder, squeezing it over a width of at least 0.8 mm as a result of the moulding operation;

then an inner portion in the form of an annular shell with a downwardly increasing diameter and a thickness of 1.2 to 4 mm:

then a bottom annular portion for fixing onto the can body, the bottom portion extending the shell and comprising an annular means for fixing onto the upper end of the tubular body of the can.

Particularly in the case of a pump but also in the case of a valve, the upper annular portion of the dome may be extended upwards by a longitudinal ring, so as to act as a protector for the dispensing means.

The annular means for fixing the dome and thus the head onto the body of the can comprises either an annular groove with an at least partly semi circular profile, enabling the rolled edge of the can to be inserted, or a skirt with an annular, typically vertical inner surface, enabling the upper, typically straight necked end of the can body to be inserted.

The dome, that is to say, all the annular moulding, part of which grips the annular shoulder of the valve or pump, is made of one of the plastics materials in the group formed by polyamides, polycarbonates, polyesters, polyacetal, polypropylene and polyethylene. According to the plastics material chosen, the dome of the head according to the invention may vary considerably in weight and minimum thickness; the thickness of its annular shell is typically from 1.5 to 3 mm. The fact that the head is moulded makes it possible to obtain an asymmetric shell, thus enabling the product to be dispensed in an oblique or lateral direction.

The subject matter of the invention is, thirdly, a dispenser comprising a preassembled head according to the invention and a can body, the head being fixed onto the upper end of the can body by its annular fixing means. Of these fixing methods, the ones best adapted to mass production at a packaging works are based on the following principles: adhesion; welding a link piece; forming a lock of plastics inside the rolled edge at the top of the tubular body, e.g. by spin welding (=friction welding) a piece of plastics held by the rolled edge; and friction welding onto the upper end of the can body in the case of a can body made of plastics. These various methods and the resultant arrangements will be illustrated in the examples.

In the common case of a metallic can body, the body is typically made of aluminium or alloy or tinplate, any of which may be covered with plastics and/or varnish. The can body typically has either a metal bottom made in one piece by extrusion or drawing or drawing and ironing, or a can body with an inpervious, crimped metal bottom.

With this type of structure the upper end of the can body may have a slight neck, either a straight neck or a neck with an external rolled edge at the top. The annular dome of the head in fact acts as a diameter adaptor. For all the preceding cases and typically in the case of a metal can made of aluminium or aluminium alloy, the neck at the upper end of the tubular body typically corresponds to a difference between the overall diameter of the body and the inside diameter of its reduced upper opening, ranging from 4 mm to a maximum of 12 mm, and the thickness of the lateral wall is reduced as already indicated, corresponding to the outside diameter of that wall in the following way; the thicknesses given in brackets concern a prior art extruded tubular body:

33 mm to less than 47 mm dia.: thickness 0.15 to 0.20 mm (0.30 to 0.35 mm)

47 mm to less than 55 mm dia.: thickness 0.20 to 0.25 mm (0.35 to 0.4 mm)

55 mm to 80 mm dia.: thickness 0.25 to 0.35 mm (0.4 to 0.6 mm)

These neck and thickness values also apply to can bodies made of tin plate which are used in accordance with the invention. The slight necking of the can body and the associated economy in metal are very important industrial advantages.

ADVANTAGES OF THE INVENTION

The advantages of the invention can be summarised as follows:

avoidance of serious corrosion risks at the location of the impervious attachments of the dispenser including such a preassembled head, since the only possible contacts are between plastics and metal;

ease in filling the can body;

ease in assembling the head and can body, several methods being available;

surprising simplification of the production of a metal can body, since it is unnecessary to form a dome and the necking is smaller;

consequently a great reduction in the thickness of the side wall of the can body, typically a relative reduction of 35 to 50%;

ease of moulding the preassembled head (dome+-valve or pump), use of the head bringing the above advantages.

DESCRIPTION OF THE PREFERRED EMBODIMENTS

1. First example of the moulding method according to the invention

Figure 1:
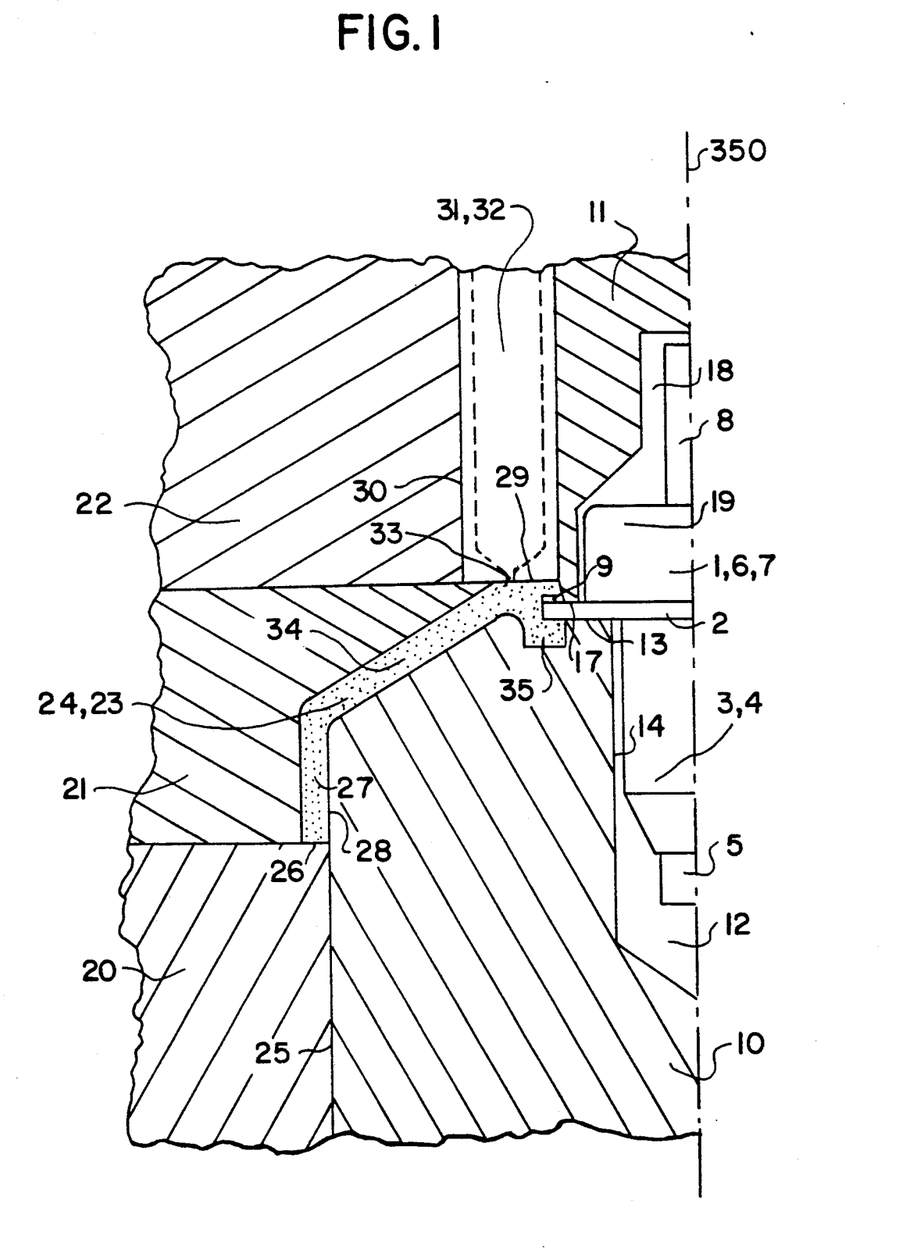
FIGS. 1 to 3 each represent a dispensing head according to the invention in the moulding position, in an axial half section, but with the pump contained in the head not shown in section.

The pump 1 in FIG. 1 is without a return airway of the type VP3 produced by Etablissements VALOIS (FR); it is covered with polypropylene. Its annual fixing shoulder 2, located substantially half way up to the body of the pump, has an outside diameter of 17.5 mm and a thickness of 1 mm. The upper surface of the shoulder, near to its end edge, has a peripheral rib 2 with a cross section of 0.4×0.4 mm. The lower part 3, containing the pump mechanism, has under its annular shoulder 2 a portion 4 17 mm high and 8 mm in diameter and a connection 5 for filling the product, below the annular shoulder 2. The portion 4 must not be heated above 70° C. and if possible not above 50° C. The upper part 6, containing the top of the mechanism and a hollow rod or output rod for actuation and ejection of the product, has a portion 7 which is 8 mm high and 11 to 11.5 mm in diameter, and an output rod 8 of diameter 3 mm.

The central tools 10 and 11 contain the pump 1 with play and tightly grip its annular shoulder 2. The central bottom tool 10 contains a central cavity 12 with an upper peripheral edge 13 above it. The lower part 3 of the pump 1 is housed in the cavity 12, with its annular shoulder 2 bearing on the upper peripheral edge 13.

The annular shoulder 2 extends 1.2 mm beyond the upper peripheral edge 13, which is 3.15 mm wide. The upper part 14 of the central cavity 12 has a diameter of 8.8 mm over a height of 18 mm, and a total depth of 23 mm. In the upper part 14 there is 0.4 mm play in diameter relative to the sensitive portion 4 of the pump 1.

The top central tool 11 bears on the annular shoulder 2 at a peripheral surface 17 with a width of 1.1 mm, located at right angles to the upper supporting edge 13. This results in tight gripping of the annular shoulder 2, extending beyond the land 17 a distance of 1.2 mm in radius, that is to say, by the width already free on its lower surface. Apart from the land 17 on the shoulder 2, the central cavity 18 in the top tool 11 has play right round the upper part of the pump 1. In particular, the cavity 18 has a first cylindrical part, 13.5 mm in diameter and 8.5 mm high, above the land 17; this part has 0.6 mm play in diameter relative to the portion 19 of the pump 1 located immediately above its annular shoulder 2.

There are three superposed annular tools 20, 21 and 22, which define an annular gap 23, together with the central tools 10 and 11 and the annular shoulder 2 of the pump 1, onto which the central tools 10 and 11 close. The gap 23 shown in the figures represents both the gap 23 and the plastics material which will be injected into it to form an annular dome 24 moulded around the pump 1 or around a valve. The bottom annular tool 20 has an inner vertical surface 25 which slides relative to the outside of the bottom central tool 10 and which defines the bottom end 26 of the annular gap 23. After the moulding operation the end 26 becomes the end of the fixing skirt 27 of the annular dome 24, with a vertical inner surface 28.

The intermediate annular tool 21 forms the outside of the annular gap 23, the distance between the tool 21 and the central bottom tool 10 governing the widths of the gap 23 and thus the thicknesses of the annular dome 24. The annular tool 22, contiguously surrounding the top central tool 11, closes the upper end 29 of the annular gap 23 and contains one or more cavities 30 on its circumference. One or more nozzles 31 are fixed in the cavities 30 with their heating system 32 and their injection orfice 33, placed at right angles to the upper end 29 of the annular gap 23.

Figure 2:
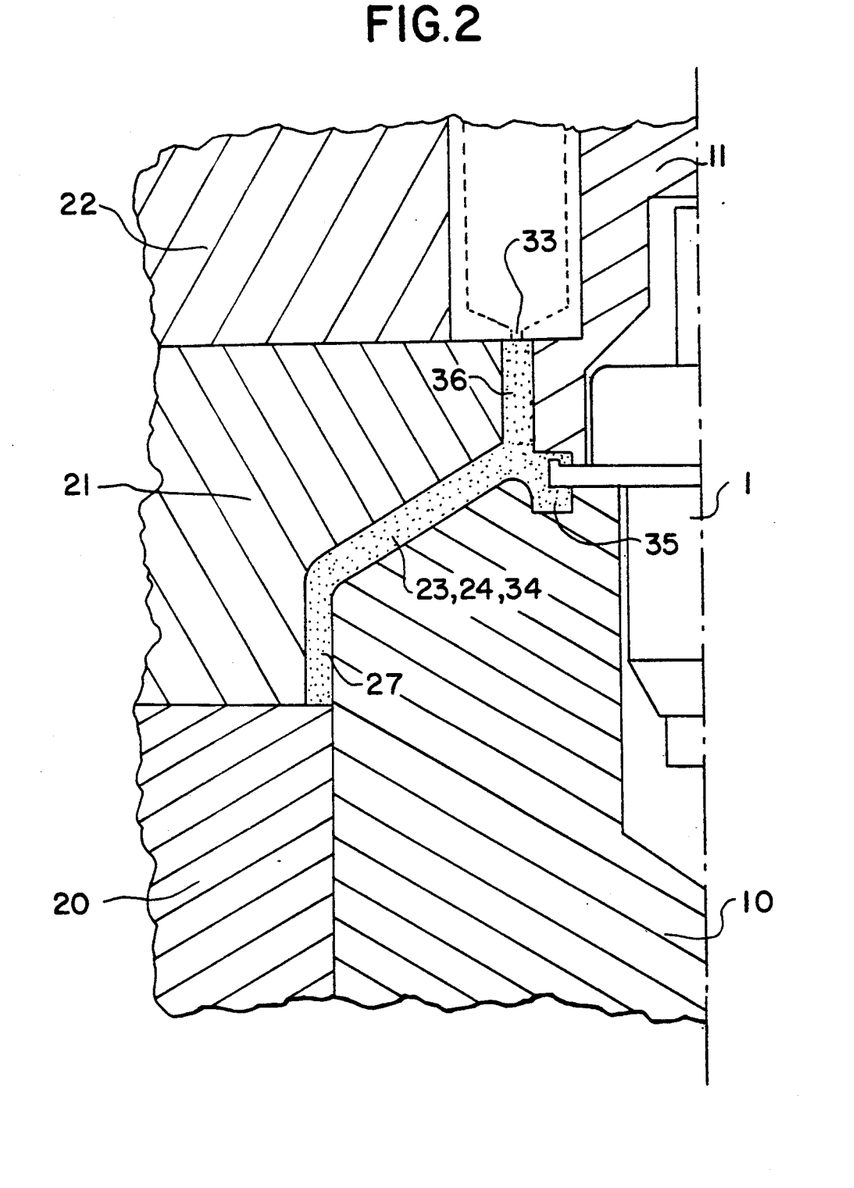
Figure 3:
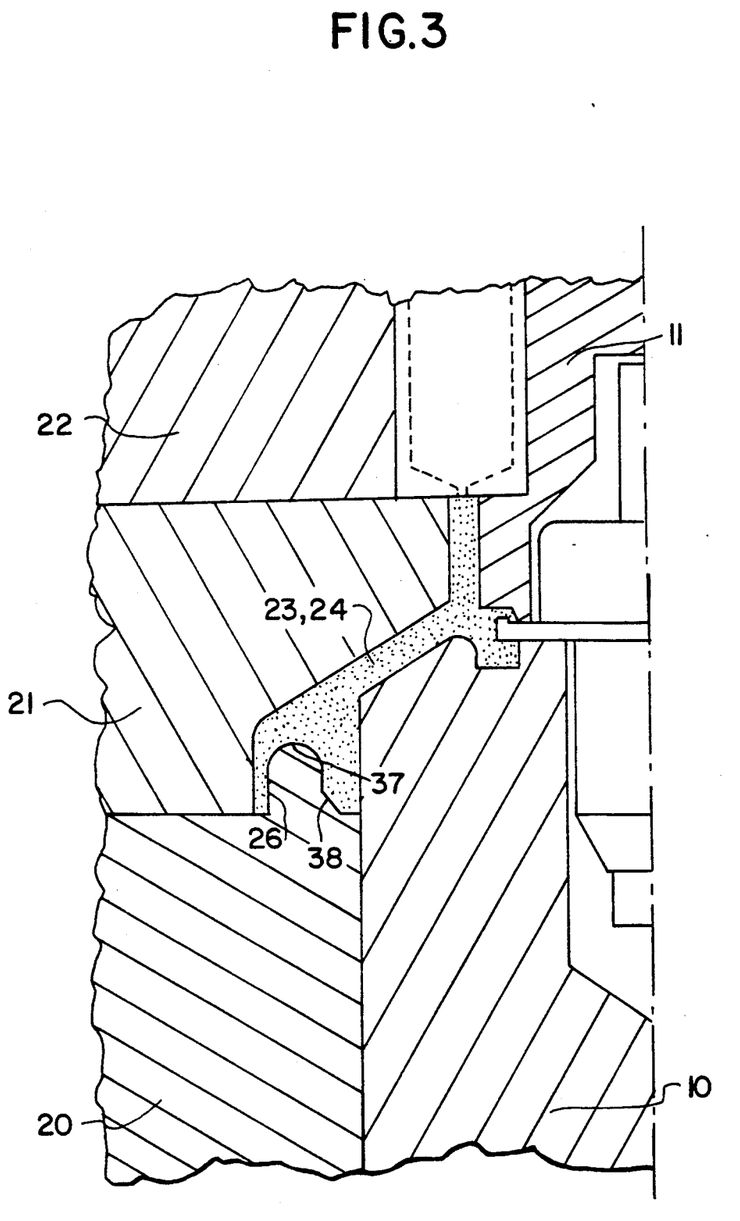

In the present case as in FIGS. 2 and 3, it is possible to mould with a single injection point 33. However, it is preferable to use three regularly spaced injection points in order to have an evenly shaped annular dome 24 in mass production.

The annular gap 23 forming the annular dome 24 has an outside diameter of 44 mm, while the annular shoulder 2 has an outside diameter of 17.5 mm, and the thickness of the frustoconical part 34 of the gap, forming the shell 34 of the dome 24, is 2.3 mm. The dome 24 is made of high density polyethylene (HDPE).

The parts of the central tools 10 and 11 which grip the annular shoulder 2 of the pump 1 define an annular cavity 35 together with the top annular tool 22. The cavity 35 forms an enlarged portion 35 4 mm thick, which fairly generously surrounds the end of the shoulder 2, contributing to the strength and tightness of the joint formed. Normal cooling of the tools from the outside is not in itself sufficient to limit the heating of the pump adequately, but heating is limited by the design of the tools and the play prescribed in the invention.

For the moulding operation the pump 1 is placed between the central tools 10 and 11, then the annular tools 20 to 22 are stacked around the central ones, with the intermediate tool 21 being centred relative to the axis of symmetry 350, so as to obtain an annular gap 23 of the same width over its whole periphery. The three nozzles 31 are then placed in their receiving positions 30 and fed from one and the same supply of molten pressurised HDPE at from 260° to 290° C. Thus the plastics material is injected simultaneously into the annular gap 23 through the three injection orifices such as 33, and the gap 23 is filled. Injection takes about 3 seconds, after which the nozzles 31 are removed and the material cooled for 12 seconds before demoulding it by relative displacement of the tools.

2. Other Examples of the Moulding Method According to the Invention

The organisation and essential functions of the tools 10, 11 and 20 to 22 are the same in FIGS. 2 and 3 as in FIG. 1. In the case of FIG. 2, the height of the annular gap 23 is increased by the addition of a vertical annular portion 36 above the surrounding cavity 35. After the moulding operation the portion 36 becomes a ring 36, which gives the link between the dome and the annular shoulder 2 still better shock protection. The intermediate annular tool 21 is thickned in the same way, and the injection orifices 33 are half way through the thickness of the upper end of the member 36.

In FIG. 3 there is a change from FIG. 2 in the means of fixing the lower end of the dome 24 onto the body of a can. The lower end 26 of the annular gap is hollowed out, so that after the moulding operation it defines an annular profile with a base 37 which is semi-circular in axial section and with straight inlet surfaces; the internal inlet surface 38 is chamfered to facilitate fitting onto the rolled edge of a receptacle. The hollowed out lower end 26 is formed by the bottom annular tool 20, as are the lower ends in FIGS. 1 and 2.

3. Examples of Dispenser Heads Obtained by the Method of the Invention (FIGS. 4 and 5)

Figure 4:
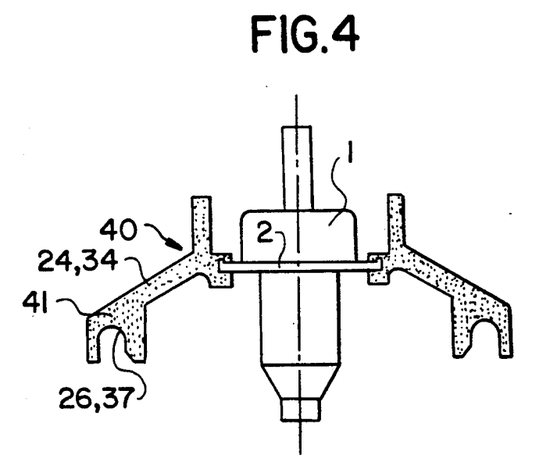
FIG. 4 represents a head resulting from the moulding in FIG. 3.

The head 40 in FIG. 4 is shown in a single axial section through its dome 24; the pump 1 and its annular shoulder 2 are not shown in section. The head 40 is obtained with the moulding arrangement in FIG. 3. The annular dome 24 is made of HDPE; its frustoconical shell 34, which is 2.3 mm thick, is followed by a lower circular portion 41 which is widened, with an outside diameter of 45 mm and an inside diameter of 39 mm. Its lower end 26, shaped as an open groove, has a semi-circular profile 37 with a radius of 1.5 mm in axial section and with a mean diameter of 42 mm. The head 40 can easily be fixed onto the rolled edge of a receptacle by gluing. Gluing tests on this configuration have shown that the surface of the circular groove 37 first has to be oxidised (corona or flame treatment), after which it is preferable to use a cyanoacrylate adhesive.

Figure 5:
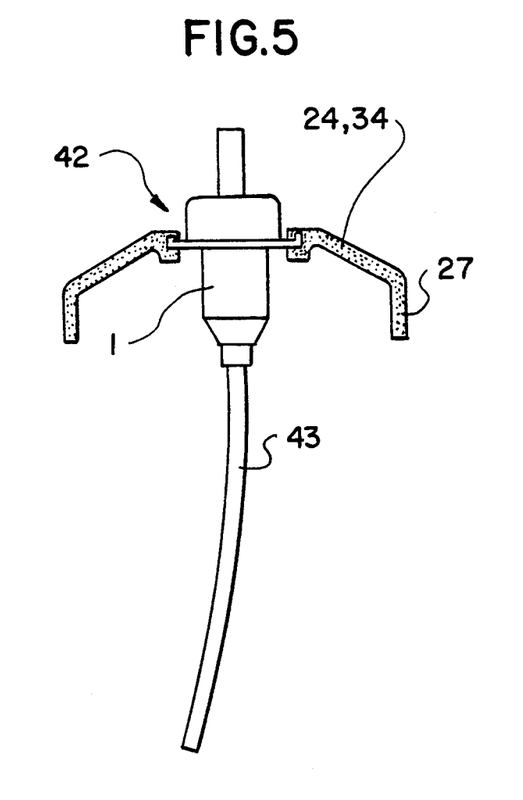
FIG. 5 represents a head resulting from the moulding in FIG. 1.

The head 42 in FIG. 5 is shown in the same way and also comprises a pump without a return airway of type VP3 produced by Establissements VALOIS (FR), covered with polypropylene; the dome 24 moulded onto it is also made of polypropylene (PP). The head 42 is obtained with the moulding arrangement in FIG. 1.

The dome 24 has a shell 34 which is 2.3 mm thick and a circular cylindrical vertical fixing skirt 27 with an outside diameter of 45 mm and an inside diameter of 41 mm. The skirt can fit onto the neck of the body of a can and be fixed to it by an appropriate method such as adhesion or friction welding. The pump is equipped with a submersible tube 43, and the head 42 has to be fixed onto the body of a can with an impervious base, to dispense a liquid contained therein.

4. Examples of Dispensers with a Head According to the Invention (FIGS. 6 to 8)

Figure 6:
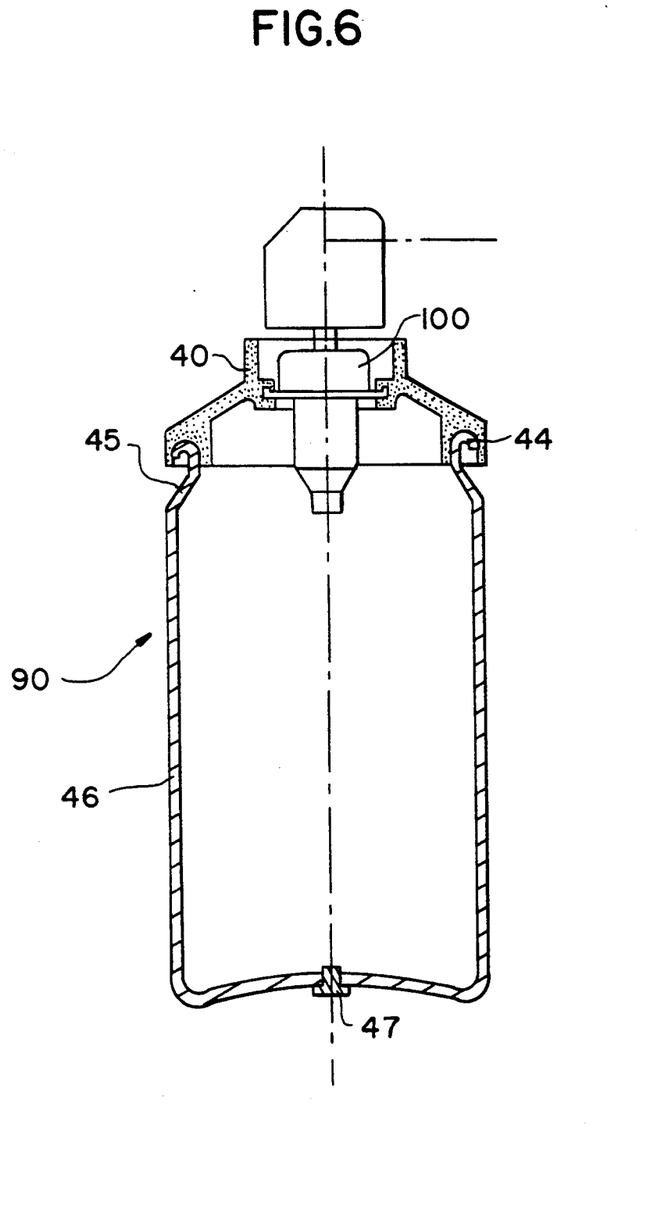
FIG. 6 is an axial section through an aerosol dispenser.

FIG. 6 represents an aerosol dispenser 90 comprising a head 40 as in FIG. 4. The head is fixed to a can body 46, made of drawn and ironed aluminium alloy, by sticking the annular fixing groove 37 of the head onto the rolled edge 44 which terminates the slight necking 45 at the upper end of the can body 46. The pump 1 is here replaced by a valve 100, and the bottom of the can body 46 contains an orifice and a stopper 47 for an aerosol application.

Figure 7:
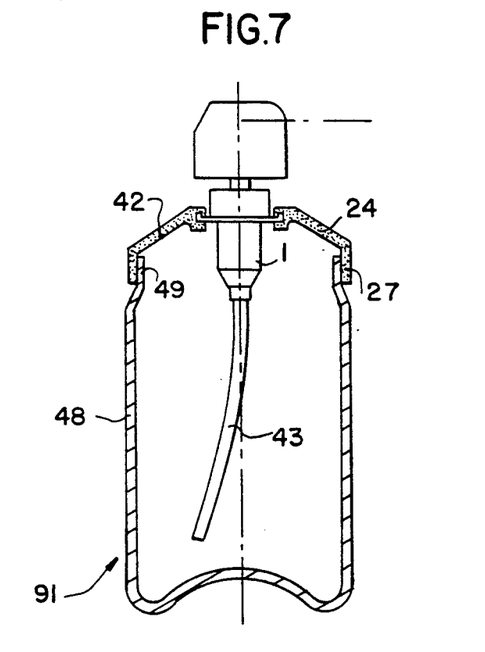
FIG. 7 is an axial section through a pump type dispenser without a return airway.
Figure 8:
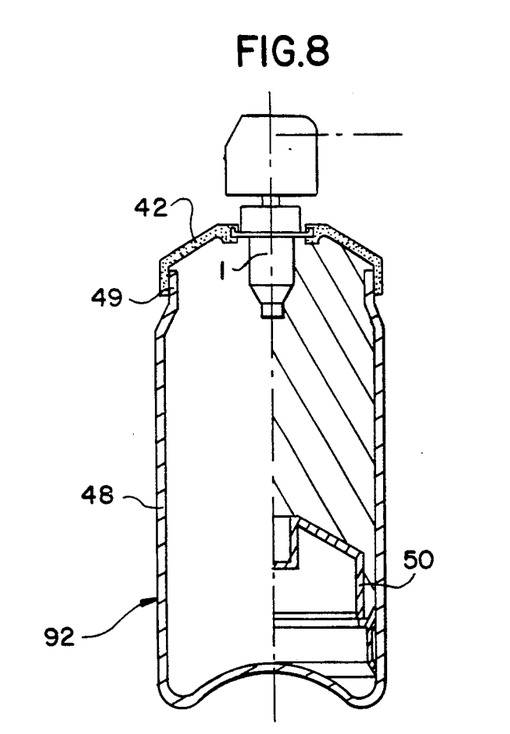
FIG. 8 is an axial section through a pump type dispenser fitted with a sliding piston, the right hand half showing the piston with the product filling the dispenser above it.

FIG. 7 shows a dispenser 91 for liquid or cream, comprising a head 42 as in FIG. 5. The head is fixed onto a can body made of aluminium alloy with an impervious integral base, the body being obtained by drawing and ironing like the body 46 in FIG. 6. The fixing skirt 27 of the dome 24 of the head 42 is stuck to the straight neck 49 at the upper end of the can body 48 with a cyanoacrylate adhesive.

To obtain satisfactory dispensing of the liquid or cream contained in the dispenser 91, the filling connection of the pump 1 is fitted with a submersible tube 43 which goes down to near the bottom of the can body 48. The initial filling of the product contained in the receptacle is limited to 70% of the internal volume.

Tests have shown that with a filling of 80% and over, pumps without a return airway do not operate satsifactorily, and that with a 70% filling operation was always satisfactory. It can be concluded from these tests that a maximum filling of 75% must be observed in the field of application of the present invention (capacities typically less than 1 liter) if the product is to be dispensed without any hitches, and that the preferred filling is from 60 to 75%.

FIG. 8 shows a dispenser 92 for a liquid or cream, also comprising a head 42 as shown in FIG. 5. This time the head has no submersible tube and is fixed onto a can body 48, in which the sliding piston 50 is inserted before the straight neck 49 is formed. Dispensing is effected by pumping, which makes the piston 50 rise, and this ensures a regular dispensing action.

5. Methods of Assembling the Pre-Assembled Head According to the Invention with the Body of a Can (FIGS. 9 to 12)

The annular dome 24 may be stuck onto a rolled or bulging edge or onto a necked end of various types of can body, made of metal, plastics, glass or ceramics. Some special methods and special cases are worth pointing out and giving as examples.

Figure 9:
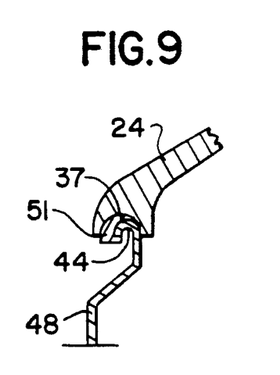
FIGS. 9 to 12 are partial views in axial half section, showing various ways of assembling the domes of a head according to the invention with a can body.

FIG. 9 shows a dome 24 being fixed onto a can body 48 by means of an annular connecting piece 51 which is compatible both with the plastics material of the dome 24—here HDPE—and the metal of the can body 48—here slightly alloyed aluminium. The member 51, which is 0.2 mm thick, is made of a complex containing EAA and the same polyolefin as that of the dome 24, i.e. PE. Its outer edge is snapped over the end of the rolled edge 44 and, after the positioning of the dome 24 which is applied to the connecting piece 51 by means of its circular groove 37, welding is carried out by one of the following methods: high frequency induction, spin welding or ultrasonics, with the shape of the dome being modified to support the ultrasonic transducer.

Figure 10:
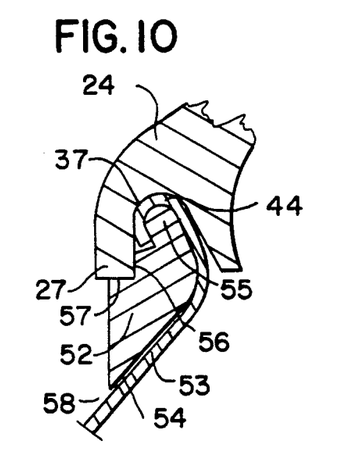

The fixing method in FIG. 10 utilises an annular holding member 52 made of a plastics material of the same type as the dome 24, the top of which is not shown. The member 52 is positioned on the shoulder or necked portion 53 of the can body located in front of the rolled part at its end edge. The member 52, which is here made of PE like the dome 24, has a base 54 which bears on the shoulder 53 of the can body, an upper portion 55 which will be crimped, as shown, by the rolling 44 of the upper end edge of the can body 48, and one or more surfaces, here the two vertical and horizontal surfaces 56 and 57 respectively, which come into contact with the outer skirt 57 of the dome 24. When the moulding member 52, the rolled edge 44 and the dome 24 have been positioned, impervious fixing is effected by spin welding the annular supporting surfaces 56 and 57 against the annular portion 27 of the dome 24. Fixing may also be effected by HF induction welding or ultrasonics.

Figure 11:
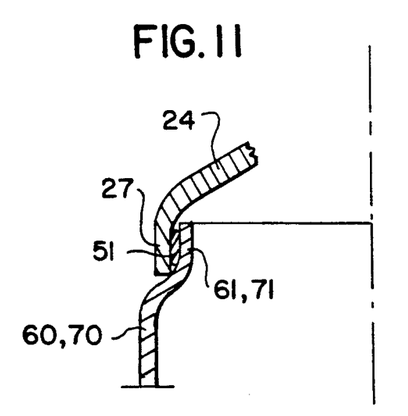

The can body 60 shown in FIG. 11 is made of plastics, here HDPE, which is 0.6 mm thick in its cylindrical portion. The moulded can body 60 has an upper cylindrical end 61 with a reduced outside diameter of 40 mm, while the dome 24 has a straight skirt 27 at its lower end. The internal cylindrical surface of the skirt is 39.8 mm in diameter and fits tightly over the end 61. It is then fixed by spin welding (friction welding). In an alternative form the parts are fixed by adhesion, the straight skirt 27 being 40.2 mm in diameter and the end 61 preferably containing slight glue retaining recesses interconnected by hollows which form bridges and are typically 0.03 to 0.08 mm thick.

The same structure is used to fix a dome of plastics material 24 over the necked end 71 of a metal can 70 (components shown in the same figure, FIG. 11). A connecting ring 51 of the same type as that in FIG. 9 is then placed round the end 71, and welding is typically effected by HF induction or spin welding. The inside diameter of the skirt 27 of the dome 24 and the thickness of the ring or bracelet 51 are selected so as to obtain a slight gripping action before welding. Gluing is also possible, the inside of the plastic skirt 27 previously being surface oxidised, and the outside of the can body 70 preferably being varnished.

Figure 12:
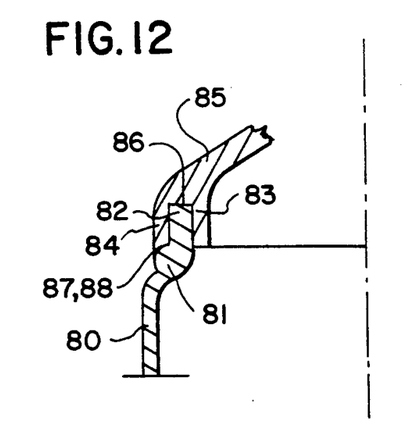

FIG. 12 shows a moulded can 80 made of HDPE which is 0.6 mm thick in its cylindrical part. The moulded can has a connection 82 of rectangular axial section at its upper end 81. The connection 82 fits tightly between the inner skirt 83 and the outer skirt 84 of the dome 85, with its horizontal end applied to the bottom of the groove 86. The parts are preferably fixed by spin welding, though adhesion is also possible. The horizontal annular surface 87 and the end 88 of the outer skirt 84 of the dome 85 may also be involved in the fixing process. In the case of spin welding, friction is encouraged by this arrangement; it gives a tight seal and results which reproduce well.

APPLICATIONS

The preassembled head according to the invention has many different applications in the packaging of liquid and cream type products in aerosol or pump dispensers, giving a longer shelf life.

What is claimed is:

1. A dispensing head (40; 42) to be fixed on a rigid tubular can body (46; 48; 60; 70; 80), and comprising an annular dome (24; 85) made of generally rigid plastic, and a valve (100) or pump (1), means non-removably fixing said valve (100) or pump (1) to the dome (24; 85), said means comprising an annular shoulder (2) of said valve (100) or pump (1) molded into said dome in a central portion of the dome, said dispensing head (40, 42) further comprising only the following portions in an outward direction from the central portion:
   an upper annular portion (35, 36) comprising an inner enlarged portion (35) which encloses the annular shoulder (2), gripping the shoulder over a width of at least 0.8 mm;
   a dome portion in the form of a frusticonical shell (34) with an outwardly increasing diameter and a generally thickness of 1.2 to 4 mm; and
   a bottom portion (27; 41; 83 and 84) for fixing onto the rigid tubular can body (46; 48; 60; 70; 80), the bottom portion extending from the frusticonical shell (34) and comprising an annular means (27; 37; 83 and 84) for fixing onto the generally upper end (44; 49; 61; 71; 81) of the rigid tubular body of the can.

2. The dispensing head (40) of claim 1, the upper annular portion (35, 36) comprising a ring (36) for longitudinal protection, above the inner enlarged portion (35) enclosing the annular shoulder (2).

3. The dispensing head (40; 42) of claim 1, wherein the inner enlarged portion (35) grips the annular shoulder (2) over a width of 1 to 3 mm.

4. The dispensing head (40; 42) of any one of claims 1 to 3, wherein the annular means for fixing the dome (24) comprises an annular groove (37) with at least a partly semi circular profile, enabling a rolled edge (44) of the rigid tubular can body (46) to be inserted.

5. The dispensing head (40; 42) of any one of claims 1 to 3, wherein the dome (24) is made of a plastic material selected from the group consisting of polyamides, polycarbonates, polyesters, polyacetal, polypropylene and polyethylene.

6. A dispensing head (40; 42) according to any one of claims 1 to 3 in combination with a can body (46; 48; 60; 70; 80) and forming a dispenser, the dispensing head being fixed tightly by the annular means (27; 37; 83 and 84) for fixing its dome (24; 85) to the upper end (44; 49; 61; 71; 81) of the can body, either by gluing or by welding an intermediate annular piece made of plastic (51; 52).

7. The dispensing head in combination with a can body according to claim 6, wherein the rigid tubular can body (46; 48; 70) is made of aluminum or aluminum alloy and has an outside diameter and a thickness satisfying the following relationships:
   diameter 33 mm to less than 47 mm: thickness 0.15 to 0.20 mm;
   diameter 47 mm to less than 55 mm: thickness 0.20 to 0.25 mm;
   diameter 55 mm to less than 80 mm: thickness 0.25 to 0.35 mm.

8. A dispensing head (40; 42) according to claim 4 in combination with a rigid tubular can body (46; 48; 60; 70; 80) and forming a dispenser, the dispensing head being fixed tightly by the annular means (27; 37; 83 and 84) for fixing its dome (24; 85) to an upper end (44; 49; 61; 71; 81) of the rigid tubular can body, either by gluing or by welding an intermediate annular piece made of plastic (51; 52).

9. A dispensing head (40; 42) according to claim 5 in combination with a rigid tubular can body (46; 48; 60; 70; 80) and forming a dispenser, the head being fixed tightly by the annular means (27; 37; 83 and 84) for fixing its dome (24; 85) to an upper end (44; 49; 61; 71; 81) of the can body, either by gluing or by welding an intermediate annular piece made of plastic (51; 52).

10. The dispensing head in combination with a rigid tubular can body according to claim 8, wherein the rigid tubular can body (46; 48; 70) is made of aluminum or aluminum alloy and has an outside diameter and a thickness satisfying the following relationships: diameter 33 mm to less than 47 mm: thickness 0.15 to 0.20 mm; diameter 47 mm to less than 55 mm: thickness 0.20 to 0.25 mm; diameter 55 mm to less than 80 mm, thickness 0.25 to 0.35 mm.

11. The dispensing head in combination with a rigid tubular can body according to claim 10, wherein the rigid tubular can body (46; 48; 70) is made of aluminum or aluminum alloy and has an outside diameter and a thickness satisfying the following relationships: diameter 33 mm to less than 47 mm: thickness 0.15 to 0.20 mm; diameter 47 mm to less than 55 mm: thickness 0.20 to 0.25 mm; diameter 55 mm to less than 80 mm, thickness 0.25 to 0.35 mm.

12. The head of claim 1, 2 or 3, wherein the annular means for fixing the dome comprises a skirt with an annular vertical inner surface, enabling the insertion of a straight necked end of a can body.

* * * * *